3,077,499
**PREPARATION OF BIS(TRIFLUORO-
METHYL)AMINE**
Charles William Tullock, Wilmington, Del., assignor to
E. I. du Pont de Nemours and Company, Wilmington,
Del., a corporation of Delaware
No Drawing. Filed Jan. 27, 1959, Ser. No. 789,275
9 Claims. (Cl. 260—583)

This invention relates to a new process for preparing fluorine-containing amines. In particular, it refers to a new method of preparing bis(trifluoromethyl)amine.

Bis(trifluoromethyl)amine, $(CF_3)_2NH$, is a colorless gas at normal atmospheric temperature and pressure, which can be condensed to a liquid which boils at −7 to −6° C. Limited studies have shown that it is an essentially neutral compound which is valuable as an intermediate in the preparation of other new and useful fluorinated compounds. To illustrate, bis(trifluoromethyl)amine is employed as a source of perfluoro-2-azapropene, $CF_3N=CF_2$, a compound which is used to form the mercurial, $(CF_3)_2N-Hg-N(CF_3)_2$.

Bis(trifluoromethyl)amine has been prepared heretofore from compounds which are costly and not readily available. It has been obtained, for example, in small quantities as a by-product of the reaction of iodine pentafluoride and cyanogen iodide or by the addition of hydrogen fluoride to perfluoro-2-azapropene, a reactant which is obtained by a multiple-step synthesis. The investigation of bis(trifluoromethyl)amine and the extension of its usefulness to still broader fields have been hampered because no method is available for preparing the compound in one step and in reasonably good yields from available low cost chemicals. An economical method for the manufacture of bis(trifluoromethyl)amine is, therefore, a desirable goal.

The present invention provides a process for obtaining bis(trifluoromethyl)amine in reasonably good yields from low cost materials. The process consists in reacting hydrogen fluoride with cyanogen, a cyanogen halide, or a cyanuric halide under substantially anhydrous conditions at a temperature of at least 125° C. for a time sufficient to produce bis(trifluoromethyl)amine. Suitable compounds for reaction with hydrogen fluoride can be represented by the formula $(CNX)_n$ where X is a halogen or a cyano (CN) group and $n$ is 1 or 3. The halogens are fluorine, chlorine, bromine or iodine. The compounds in which X is a halogen and $n$ is 3 are frequently referred to as cyanuric halides.

The process of the invention is basically a reaction of the two components, that is, a cyanogen compound and hydrogen fluoride. When these two components are present, no additional reactants are needed to bring the process to completion. However, it is possible to employ precursors of the cyanogen compound, in particular, precursors of cyanogen halides. Precursors are compounds which will react in situ to form a cyanogen halide which then reacts with hydrogen fluoride to form bis(trifluoromethyl))amine. The use of precursors of cyanogen halides represents an optional method of operating the process and is included in the scope of the invention.

The mechanism of the reaction is not known. The principal volatile fluorine-bearing nitrogen compound which is obtained is bis(trifluoromethyl)amine. Volatile by-products are also obtained which are derived from reaction of the components with adventitious impurities, principally traces of moisture. Rigorous exclusion of moisture is, therefore, desirable to obtain the maximum yield of bis(trifluoromethyl)amine. Some solid by-products are also obtained whose composition is unknown.

The reactants employed in the process are well-known and readily available materials. Hydrogen fluoride can be obtained commercially and need not be rigorously purified for use. As noted earlier, the reactants should be substantially anhydrous for maximum yield of the amine. The cyanogen compounds can be cyanogen, cyanogen fluoride, cyanogen chloride, cyanogen bromide or cyanogen iodide. The corresponding cyanuric fluoride, cyanuric chloride, cyanuric bromide and cyanuric iodide can also be employed. Cyanogen fluoride and cyanogen chloride are preferred because they are readily available.

The cyanogen halide can be employed as the preformed product or it can be generated in situ by reaction of a halogen with one of the inorganic cyanides or inorganic thiocyanates which are known to undergo such a reaction, e.g., sodium cyanide, potassium cyanide, calcium cyanide, ferric cyanide, hydrogen cyanide, sodium thiocyanate, potassium thiocyanate, ammonium thiocyanate, calcium thiocyanate and the like. In this method of operation the preferred precursors are chlorine and sodium cyanide or sodium thiocyanate.

The ratio of the reactants is not critical for operability. However, in order to obtain maximum yield of bis(trifluoromethyl)amine it is desirable that the molar ratio of the cyanogen compound to hydrogen fluoride is not less than about 1:30 or more than about 5:1; preferably the molar ratio for these components lies between about 1:20 and 3:1. Greater or lesser amounts of hydrogen fluoride may be used than indicated by the above ranges, but since it is desirable that sufficient hydrogen fluoride be used to react with all of the cyanogen compound, an excess of hydrogen fluoride will ordinarily be employed. Unreacted hydrogen fluoride can be recovered and reused.

The reaction is conducted under substantially anhydrous conditions in either a batch or continuous flow process. In either process the reaction chamber is preferably made of material which is resistant to chemical attack by hydrogen fluoride, for example, a nickel-iron-molybdenum alloy.

In a batch process a vessel capable of withstanding pressure is preferably flushed with an inert gas, for example, nitrogen, to displace air and moisture. It is then chilled in a suitable refrigerant, for example, solid carbon dioxide-acetone solution or liquid nitrogen. The vessel is evacuated to a low pressure, for example, 10 mm. or less, and charged with the reactants. The reaction vessel is closed, and the mixture is heated to the desired temperature with suitable mechanical agitation.

The temperature at which the reaction is conducted is at least 125° C. and will generally lie between about 125° and 800° C. The preferred temperature range for optimum yield lies between about 150° and 500° C. A temperature range of 200–450° C. is especially preferred. Excessively high temperatures are unnecessary and provide little or no advantage in economy of operation or yield of desired product.

Heating of the reactants can be accomplished by a stepwise procedure wherein the reactants are maintained for short periods of time at progressively higher temperatures. This procedure permits smooth operation of the process and avoids sudden increases in pressure in the reaction vessel. However, this procedure is not essential for operability. If desired, the reactants can be heated in one step to the reaction temperature. The time of heating is not critical. A time sufficient to produce the desired compound is all that is required. Generally the reactants are heated for between about 2 hours and about 48 hours.

The pressure employed in a batch process is generally autogenous and can be between about 5 atmospheres and 250 atmospheres or higher. During the reaction period the contents of the vessel are preferably mixed, for example, by mechanical stirring or shaking.

The process of the invention can also be conducted by a continuous flow method wherein, for example, the gaseous cyanogen compound and hydrogen fluoride are led through separate lines into a reaction chamber which is heated to the desired reaction temperature. Unreacted materials can be separated from the reaction product and recirculated through the reaction zone. A continuous process can be operated at atmospheric pressure or at pressures which are higher or lower than atmospheric.

To obtain pure bis(trifluoromethyl)amine, the crude reaction product is freed of hydrogen fluoride by suitable means, for example, by treatment with a hydrogen fluoride acceptor or by distillation. Sodium fluoride or potassium fluoride are satisfactory and readily available hydrogen fluoride acceptors. The product is further purified by careful fractional distillation in a low temperature distillation unit. The pure product boils at −7 to −6° C., but fractions boiling between about −10° and about −3° C. are substantially pure. The purity of bis(trifluoromethyl)amine can be established by conventional methods, for example, infrared spectroscopy, gas chromatography and the like. The product can be stored under anhydrous conditions in corrosion-resistant cylinders at ordinary atmospheric temperatures.

The following examples, in which quantities are expressed as parts by weight, illustrate the process of the invention. In each of the examples the reaction vessel is capable of withstanding pressure and is lined with an alloy of nickel, iron and molybdenum which is resistant to attack by hydrogen fluoride. Suitable precautions are taken to exclude moisture while the reaction vessels are being charged with the reactants.

*Example I*

A. A pressure vessel (capacity, 1000 parts of water) is flushed with nitrogen gas and cooled with a solid carbon dioxide-acetone mixture. The bomb is charged with 61 parts of cyanogen chloride and 100 parts of hydrogen fluoride and sealed. It is placed on an agitating rack and heated at 250° C. for 6 hours. The pressure vessel is then cooled to room temperature, and the gaseous reaction products are transferred to a cold evacuated cylinder (corrosion-resistant) which contains 250 parts of sodium fluoride. After standing 1 day at room temperature (about 25° C.), the volatile products from three runs are stored over a fresh batch of 125 parts of sodium fluoride for an additional day at about 25° C. The volatile products from six runs are combined in a cooled corrosion-resistant cylinder and the combined products (144 parts) are distilled through a low temperature fractionating column to yield 129 parts of pure bis(trifluoromethyl amine, boiling at −7.5° to −6.5° C.

B. Using the procedure described in the preceding paragraph a mixture of 61 parts of cyanogen chloride and 100 parts of hydrogen fluoride is heated at 75° C. for 3 hours, 150° C. for 1 hour and 250° C. for 6 hours. There is obtained 82 parts of volatile products which are stored successively over 175 parts of sodium fluoride for about 5 hours and 75 parts of fresh sodium fluoride for about 18 hours. The volatile products which remain (17 parts) are distilled to yield 10 parts of bis(trifluoromethyl)amine (about 90% purity), boiling at −7 to −5° C.

C. A mixture of 31 parts of cyanogen chloride and 50 parts of hydrogen fluoride is reacted as described above at 75° C. for 1 hour, 150° C. for 1 hour, 250° C. for 2 hours and 325° C. for 2 hours. There is obtained 6 parts of volatile products of which 40–45% is bis(trifluoromethyl)amine, the remainder being carbon dioxide. The low yield of desired product is due to the presence of a minute quantity of water during the reaction and illustrates the need for anhydrous conditions to obtain maximum yield of desired product.

D. A mixture of 61 parts of cyanogen chloride and 100 parts of hydrogen fluoride is reacted as described above at 75° C. for 1 hour and 150–160° C. for 1 hour. There is obtained 3 parts of volatile products of which 30–35% is bis(trifluoromethyl)amine.

*Example II*

A pressure vessel (capacity, 200 parts of water) is charged as described in Example I, part A, with 8.5 parts of cyanogen fluoride and 22 parts of hydrogen fluoride. The mixture is heated with agitation at 150° C. for 2 hours, 200° C. for 2 hours and 250° C. for 6 hours. There is obtained by the procedures described earlier 3 parts of bis(trifluoromethyl)amine of 75–80% purity.

Cyanogen bromide and hydrogen fluoride can be reacted by the procedure described in Examples I and II to yield bis(trifluoromethyl)amine. Cyanogen iodide can be employed with hydrogen fluoride to form the amine.

*Example III*

A. A pressure vessel (capacity, 500 parts of water) is charged as described in Example I, part A, with a mixture of 31 parts of cyanuric chloride, (CNCl)₃, and 50 parts of hydrogen fluoride. The mixture is heated with agitation at 150° C. for 1 hour, 250° C. for 2 hours and 325° C. for 6 hours. There is obtained 49 parts of volatile products which are purified by storage over sodium fluoride to yield bis(trifluoromethyl)amine.

B. Using the procedure described in part A above, bis(trifluoromethyl)amine is obtained by reacting 22 parts of cyanuric fluoride, (CNF)₃, and 40 parts of hydrogen fluoride for 1 hour at 150° C., 2 hours at 250° C. and 6 hours at 325° C.

As stated previously in the description of the invention, precursors of cyanogen halides can be employed in the process. The following examples illustrate this embodiment of the invention.

*Example IV*

A pressure vessel (capacity, 500 parts of water) is charged, as described in Example I, part A, with 25 parts of sodium cyanide, 50 parts of hydrogen fluoride and 36 parts of chlorine. The mixture is heated with agitation at 75° C. for 2 hours, 150° C. for 1 hour, 250° C. for 1 hour and 325° C. for 2 hours. There is obtained 41 parts of volatile products which after purification, yield 5 parts of bis(trifluoromethyl)amine of about 60% purity.

*Example V*

A. A mixture of 20 parts of sodium thiocyanate, 25 parts of hydrogen fluoride and 53 parts of chlorine is heated in a pressure vessel (capacity, 500 parts of water) at 75° C. for 3 hours, 150° C. for 1 hour and 250° C. for 6 hours. There is obtained 43 parts of volatile product which, after purification, yields 14 parts of bis(trifluoromethyl)amine of about 90% purity.

B. A pressure vessel (capacity, 1000 parts of water) is charged, as described in Example I, part A, with 40 parts sodium thiocyanate, 75 parts hydrogen fluoride and 105 parts chlorine. The mixture is heated with agitation at 75° C. for 3 hours, 150° C. for 1 hour and 250° C. for 6 hours. There is obtained 114 parts of volatile products which is combined with the volatile products obtained from three similar runs. Purification of the combined crude products, as described in the previous examples, yields 36 parts of bis(trifluoromethyl)amine, boiling at −10 to −40° C. The purity of the product is greater than 90%, as determined by infrared spectroscopy.

*Example VI*

A mixture of 17 parts of cyanogen, (CN)₂, and 60 parts of hydrogen fluoride is heated in a pressure vessel (capacity, 500 parts of water) at 75° C., for 1 hour, 150° C. for 1 hour and 250° C. for 1 hour. There is obtained 45 parts of volatile products from which 4 parts of bis-(trifluoromethyl)amine of 65-70% purity are obtained by methods described previously.

Bis(trifluoromethyl)amine is valuable as an intermediate compound for the preparation of other useful products. For example, it is converted by passage through a carbon arc to tetrafluoroethylene, a fluoroolefin from which a technically valuable polymer is obtained.

What is claimed is:

1. In a process of preparing bis(trifluoromethyl)-amine, the step of heating a reaction mixture initially consisting of hydrogen fluoride and a cyanogen compound selected from the group consisting of cyanogen, a cyanogen halide and a cyanuric halide at a temperature of at least 125° C. under substantially anhydrous conditions.

2. The process of claim 1 wherein said cyanogen compound is cyanogen.

3. The process of claim 1 wherein said cyanogen compound is a cyanogen halide.

4. The process of claim 3 wherein said cyanogen halide is cyanogen chloride.

5. The process of claim 3 wherein said cyanogen halide is cyanogen fluoride.

6. The process of claim 1 wherein said cyanogen compound is a cyanuric halide.

7. The process of claim 1 wherein said step is conducted under the autogenous pressure of the reaction mixture at a temperature between about 200 and about 450° C.

8. In a process of preparing bis(trifluoromethyl)-amine, the step of heating a reaction mixture initially consisting of hydrogen fluoride, chlorine, and a member of the group consisting of sodium cyanide and sodium thiocyanate at a temperature of at least 125° C. under substantially anhydrous conditions.

9. The process of claim 8 wherein said step is conducted under the autogenous pressure of the reaction mixture at a temperature between about 200 and about 450° C.

References Cited in the file of this patent

Barr et al.: J.C.S. (London), 1955, page 2532. (Copy in Library.)

Ruff et al.: Ber., volume 73, pages 724-9 (1940). (Copy in Library.)